United States Patent

Graffin

Patent Number: 5,450,877
Date of Patent: Sep. 19, 1995

[54] MAGNETICALLY-CONTROLLED VALVE

[75] Inventor: André Graffin, La Chapelle du Bois, France

[73] Assignee: Serac, La Ferte Bernard, France

[21] Appl. No.: 243,920

[22] Filed: May 17, 1994

[30] Foreign Application Priority Data

May 28, 1993 [FR] France ................ 93 06422

[51] Int. Cl.⁶ ........................................ F16K 31/08
[52] U.S. Cl. ........................ 137/630.14; 251/65; 251/340
[58] Field of Search ............ 251/65, 340, 129.21; 137/630.14, 630.15

[56] References Cited

U.S. PATENT DOCUMENTS

| | | | |
|---|---|---|---|
| 1,342,641 | 6/1920 | Moreton | 251/129.21 |
| 2,405,127 | 8/1946 | Beach | 251/65 X |
| 2,688,340 | 9/1954 | Stehlin | 137/630.14 |
| 3,669,315 | 6/1972 | Kuckens | 251/129.21 |
| 4,672,203 | 9/1987 | Holkeboer | |
| 4,940,207 | 10/1990 | Katsuyama | |
| 5,069,239 | 12/1991 | Bunce | 251/65 X |

FOREIGN PATENT DOCUMENTS

| | | |
|---|---|---|
| 0329287 | 1/1989 | European Pat. Off. |
| 1257506 | 12/1967 | Germany |
| 2005592 | 8/1970 | Germany |

Primary Examiner—Robert G. Nilson
Attorney, Agent, or Firm—Griffin, Butler Whisenhunt & Kurtossy

[57] ABSTRACT

The valve includes a tubular body made of a non-magnetic material, a seat carried by the tubular body, a closure member disposed inside the tubular body and facing the seat, the closure member including a valve member connected to a drive ring made of a magnetic material extending substantially coaxially with the tubular body and facing a magnetic field generator disposed outside the tubular body and associated with a control member.

3 Claims, 1 Drawing Sheet

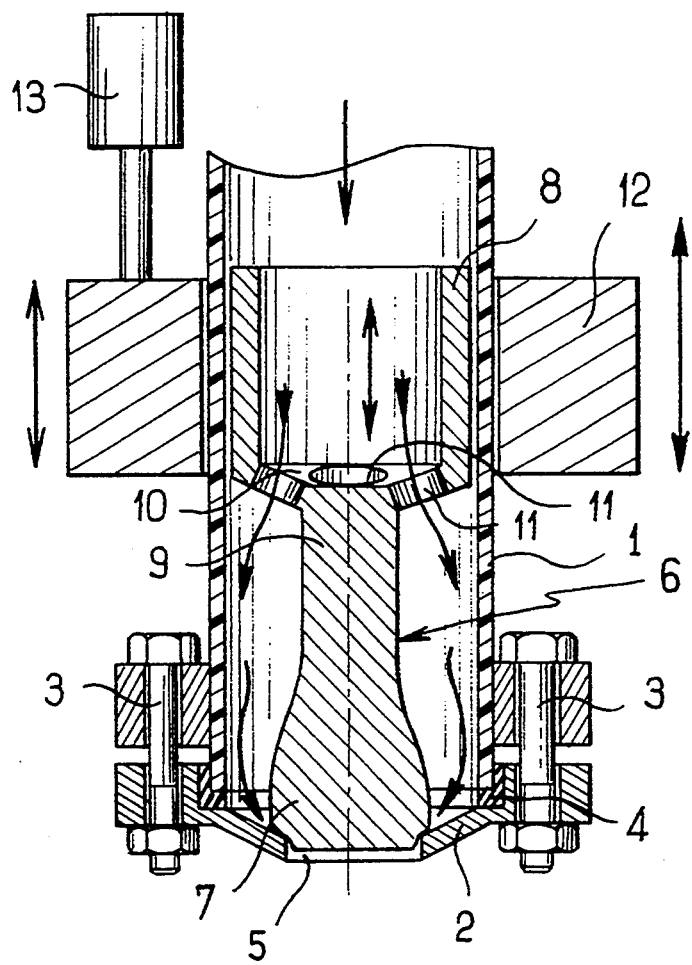
FIG_1
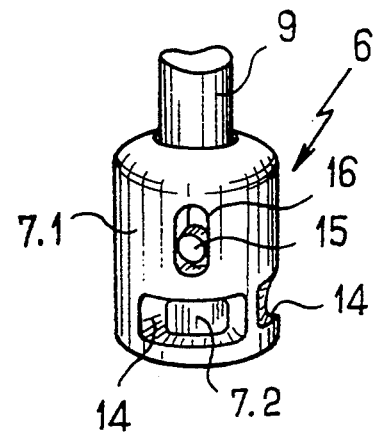
FIG_3
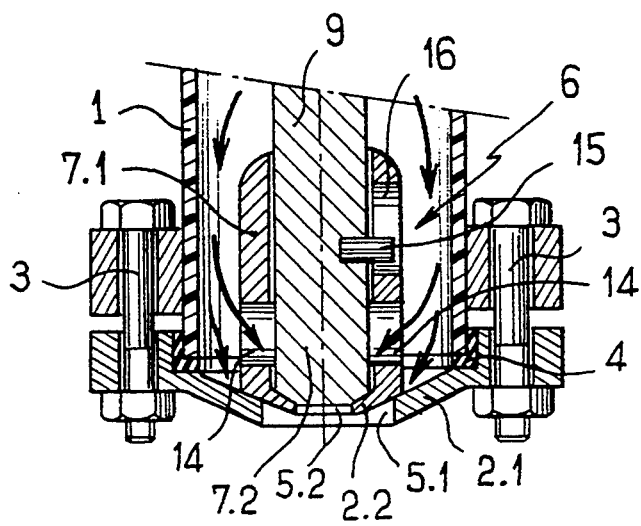
FIG_2

MAGNETICALLY-CONTROLLED VALVE

The invention relates to a magnetically-controlled valve, particularly but not exclusively for actuating the filling spouts of a machine for filling liquid into packages.

BACKGROUND OF THE INVENTION

Numerous devices are known that enable a filling spout to be actuated in a packaging machine. Most such devices include a control member passing through the wall of the filling spout so that it is necessary to provide sealing to prevent the substance being packaged from leaking out where the control member passes through the wall.

Providing such sealing poses difficult problems when the substances to be packaged are abrasive or chemically aggressive, because there is then a danger that the sealing gaskets might be degraded rapidly if the material used for the gaskets is not compatible with the substance being packaged. Major problems also arise when substances are to be packaged in sterile manner, because they must be protected from being polluted by the control devices passing through the wall. Such protection requires complex devices that use vapor barriers or sterile-fluid barriers.

To avoid the necessity of having a control member that passes through the filling spout, Document U.S. Pat. No. 4,940,207 discloses a control valve including a valve member connected to a solid cylindrical magnetic core disposed coaxially inside a non-magnetic tubular body, the position of the valve member being controlled from the outside by using a magnetic field. Unfortunately, such a device suffers from the drawback that the substance to be dispensed flows between the magnetic core and the wall of the tubular body. This means that, to achieve a force that is large enough to raise the valve member, the flow must be limited if the distance between the outside surface of the magnetic core and the magnetic field generator is to be limited.

OBJECT AND SUMMARY OF THE INVENTION

The invention provides a magnetically-controlled valve of the type described in the above-mentioned document, in which the drive member is a ring connected to the valve member via a link member enabling a flow to pass through the ring.

In this way, a magnetic attraction force is obtained that is large enough to raise the valve member in spite of high dynamic pressures, while making it possible to have a magnetic field generator that is compact.

According to an advantageous aspect of the invention, the closure member includes a first valve member having one end extending facing a main outlet orifice delimited by the seat carried by the tubular body, and a second valve member connected to the drive member and slidably mounted inside the first valve member, the first valve member is provided with at least one passage opening out at one end inside the tubular body, and at its other end at the end of the first valve member facing the main outlet orifice, the passage being provided with a secondary seat surrounding a secondary outlet orifice disposed facing one end of the second valve member, and the first valve member and the second valve member are connected together via a link member displacing the second valve member on its own while the drive member is being actuated over a first stroke from a closed position of the valve, and displacing the first valve member together with the second valve men, her when the drive member is actuated beyond said first stroke.

In this way, when the secondary outlet orifice is opened, the static pressure on the first valve member decreases upstream therefrom relative to the flow direction, so as to facilitate displacement of the first valve member.

In a preferred embodiment relating to this aspect of the invention, the first valve member and the second valve member are mounted so that they can be displaced in a direction that is substantially parallel to a longitudinal axis of the tubular body, and the main outlet orifice, and the secondary outlet orifice are coaxial with the longitudinal axis of the tubular body. In this way, the flow of liquid remains properly centered regardless of the extent to which the valve is opened, and the valve may therefore be used for filling receptacles having necks having sizes that are very similar to those of the outlet orifices.

BRIEF DESCRIPTION OF THE DRAWING

Other characteristics and advantages of the invention appear on reading the following description of two particular non-limiting embodiments of the invention given with reference to the accompanying drawing, in which:

FIG. 1 is an axial section view through a first embodiment of the valve of the invention;

FIG. 2 is a fragmentary axial section view through a second embodiment of the invention; and FIG. 3 is a perspective view of the closure member in the second embodiment of the invention.

MORE DETAILED DESCRIPTION

With reference to FIG. 1, a magnetically-controlled valve of the invention is described as used as a filling spout in a machine for filling liquid into packages. In the embodiment shown in FIG. 1, the valve includes a cylindrical tubular body 1 made of a non-magnetic material whose top end is connected to a feed tank (not shown), and whose bottom end is provided with a seat 2 removably fixed to the tubular body 1 by bolts 3, sealing being provided between the tubular body 1 and the seat 2 by means of an annular gasket 4. The seat 2 is provided with an outlet orifice 5, and a closure member given the overall reference 6 is disposed facing the orifice.

The closure member 6 includes a valve member proper 7 which bears against the seat 2 under its own weight so as to close the outlet orifice 5. The valve member 7 is connected to a drive member 8 in the form of a ring made of a magnetic material. The valve member 7 is linked to the ring 8 by a small-diameter rod 9 which extends coaxially inside the tubular body 1, and which is connected to the ring 8 via a web 10 provided with holes 11 enabling the liquid to flow through the web 10 towards the outlet orifice 5. The drive ring 8 also extends coaxially inside the tubular body 1, and has an outside diameter that is preferably substantially equal to the inside diameter of the tubular body 1 so as to slide freely therein while being guided thereby.

Facing the drive ring 8 and outside the tubular body 1, the valve of the invention includes a magnetic field generator 12, e.g. a magnetized ring or a coil surrounding the tubular body 1, and is associated with a drive member 13, e.g. a hydraulic or pneumatic actuator, or a stepper motor associated with an endless screw for controlling the height at which the magnetic field generator 12 is positioned.

In operation, the valve is normally held closed by the weight of the closure member 6 and of the drive ring 8 tending to push the valve member 7 against the seat 2, and also by the static pressure which is exerted on the moving assembly, and, where applicable, by the magnetic attraction which is exerted on the drive ring 8 if the magnetic field generator 12 is disposed at a lower level than the drive ring 8. In use, the magnetic field generator 12 is displaced upwards, and the magnetic attraction then tends to raise the drive ring 8 to a position of equilibrium, in which the magnetic attraction exerted by the magnetic field generator 12 is balanced by the weight of the moving equipment 6, 8, and by the dynamic forces exerted on the moving equipment due to the substance flowing out from the tubular body 1. The flow-rate through the outlet orifice 5 may therefore be set very accurately by acting on the magnetic field generator 12.

FIGS. 2 and 3 show another embodiment enabling the valve to be opened with a small force, and enabling the liquid to flow out at various rates that can be controlled very accurately.

In this embodiment, the top portion of the filling spout is identical to that shown in FIG. 1 and it is therefore not shown. Only the closure member, given the overall reference 6, has a structure that is different from the embodiment shown in FIG. 1. In this embodiment, the closure member includes a first valve member 7.1 in the form of a tubular sleeve whose bottom end bears against the seat carried by the tubular body 1. In this embodiment, this seat is referred to below as the main seat, and is referenced 2.1, the corresponding outlet orifice being referred to as the main outlet orifice and being referenced 5.1.

The closure member further includes a second valve member 7.2 formed by the bottom portion of the rod 9 and slidably mounted inside the first valve member 7.1. The bottom end of the second valve member 7.2 bears against a secondary seat 2.2 provided at the bottom end of the first valve member 7.1. The secondary seat 2.2 delimits a secondary outlet orifice 5.2 which is connected to the inside of the tubular body 1 via holes 14 which extend radially through the wall of valve member 7.1.

Furthermore, the second valve member 7.2 is provided with a lug 15 that projects radially into a slot 16 which is provided in valve member 7.1, and which extends in a direction that is parallel to the axis of the tubular body 1.

The second embodiment operates as follows: in the position shown in FIG. 2, the secondary valve member 7.2 bears against the secondary seat 2.2 under the combined effect of the weight of the valve member and of the weight of the moving equipment with which it is associated, of the static pressure exerted on the top end of the rod 9 and of the magnetic force exerted on the ring 8 if the magnetic drive member 12 is positioned at a level that is slightly below the drive ring 8. These combined forces close the secondary outlet orifice 5.2. Simultaneously, the first valve member 7.1 bears against the main seat 2.1. under the combined forces resulting from the force applied by valve member 7.2 to the seat 2.2 which is secured to the first valve member 7.1, and from the static pressure forces which are exerted on valve member 7.1. From this position, the magnetic drive member 12 being displaced upwards entrains the drive ring 8 upwards and progressively opens the secondary outlet orifice 5.2. So long as the lug 15 provided on the second valve member 7.2 has not reached the top end of slot 16, the first valve member 7.1 remains closed under the effect of the static pressure that is exerted on its top end, and of the dynamic pressure that is exerted in holes 14. Therefore, only the second valve member is displaced when the drive ring 8 is actuated over a first stroke from the closed position of the valve. When the lug 15 reaches the top end of slot 16, any subsequent upward displacement of the drive ring 8 causes the first valve member 7.1 to be raised, thereby opening the main outlet orifice 5.1. It should be noted that by opening the secondary outlet orifice 5.2 before the first drive member 7.1 is driven, the static pressure that is exerted on the first valve member 7.1 is reduced, thereby minimizing the force required to raise the first valve member.

The successive opening of the secondary outlet orifice 5.2. and of the main outlet orifice 5.1. may be used in two ways. In a first use of this characteristic, the filling spout of the invention may be used to fill receptacles having necks of different sizes by adapting the opening of the spout to the size of the neck in the receptacle during filling. In particular, for small-diameter necks, the displacement of the drive ring 8 is limited so as to open the secondary outlet orifice 5.2 only, whereas for receptacles having large-diameter necks, the displacement of the drive ring 8 can be set so as to cause the main outlet orifice 5.1 to open, thereby enabling the flow-rate of the liquid to be higher, so that the receptacle can be filled more quickly.

In another use of this characteristic of the invention, for a receptacle having a neck that is larger than the main outlet orifice 5.1, the spout of the invention may be used to modulate the flow-rate, thereby enabling filling to be quick while remaining very accurate. In particular, it is possible to have a first filling step, during which only the secondary outlet orifice 5.2 is open so that a small quantity of liquid is fed in, thereby preventing froth from forming, followed by a second step, during which the main outlet orifice 5.1 is wide open, followed by a final step, during which only the secondary outlet orifice 5.2 is open so as to reduce the flow-rate, thereby enabling the end of filling to be determined very accurately.

In the embodiment shown, the first valve member and the second valve member are coaxial with the tubular body 1 so that the jet of liquid is distributed uniformly regardless of the extent to which the valve members are opened. In this way, the jet is prevented from being diverted, so that it does not produce splashes outside the neck of the receptacle being filled.

Naturally, the invention is not limited to the embodiments described, and variants may be made thereon without going beyond the ambit of the invention as defined by the claims. In particular, although the link between the drive ring 8 and the valve member 7 is shown in the form of a web 10 associated with a rod 9 and provided with openings 11, other link members may be provided, such as arms connecting the ring to the valve member. Although the ring 8 is shown in one piece with the valve member 7 or with the second valve member 7.1, a separate ring made of a magnetic material may be attached to a valve member made of any material that is suited to the substance to be packaged.

Although the second embodiment of the invention is shown with a closure member comprising only two valve members, it is possible to provide a greater number of nested valve members that successively open outlet orifices having respective larger diameters from one orifice to the next.

Although the valve of the invention is shown as used as a filling spout, i.e. disposed at the end of a pipe, it may also be used as a valve separating two lengths of pipe.

We claim:

1. A magnetically-controlled valve including a tubular body made of a non-magnetic material, a magnetic field generator disposed outside the tubular body and associated with a control member, a closure member disposed inside the tubular body connected to a ring drive member made of a magnetic material extending substantially coaxially with the tubular body and facing the magnetic field generator, the ring drive member also being connected to a valve member via a link member enabling a flow to pass through the ring drive member, said closure member including a first valve member having one end extending to and facing a main outlet orifice delimited by a seat carried by the tubular body, and a second valve member connected to the ring drive member and slidably mounted inside the first valve member, wherein the first valve member is provided with at least one passage opening at one end inside the tubular body and at another end at the end of the first valve member facing the main outlet orifice, the passage being provided with a secondary seat surrounding a secondary outlet orifice disposed facing one end of the second valve member, and wherein the first valve member and the second valve member are connected together via a further link member displacing the second valve member on its own while the drive member is being actuated over a first stroke from a closed position of the valve, and displacing the first valve member together with the second valve member when the drive member is actuated beyond said first stroke.

2. A magnetically-controlled valve according to claim 1, wherein the first valve member and the second valve member are mounted so that they can be displaced in a direction that is substantially parallel to a longitudinal axis of the tubular body, and wherein the main outlet orifice, and the secondary outlet orifice are coaxial with the longitudinal axis of the tubular body.

3. A magnetically-controlled valve according to claim 1, wherein the further link member is provided with a lug on the second valve member, and co-operating with a slot provided in the first valve member.

* * * * *